F. RENZ.
Making Chemicals.
No. 80,835. Patented Aug. 11, 1868.
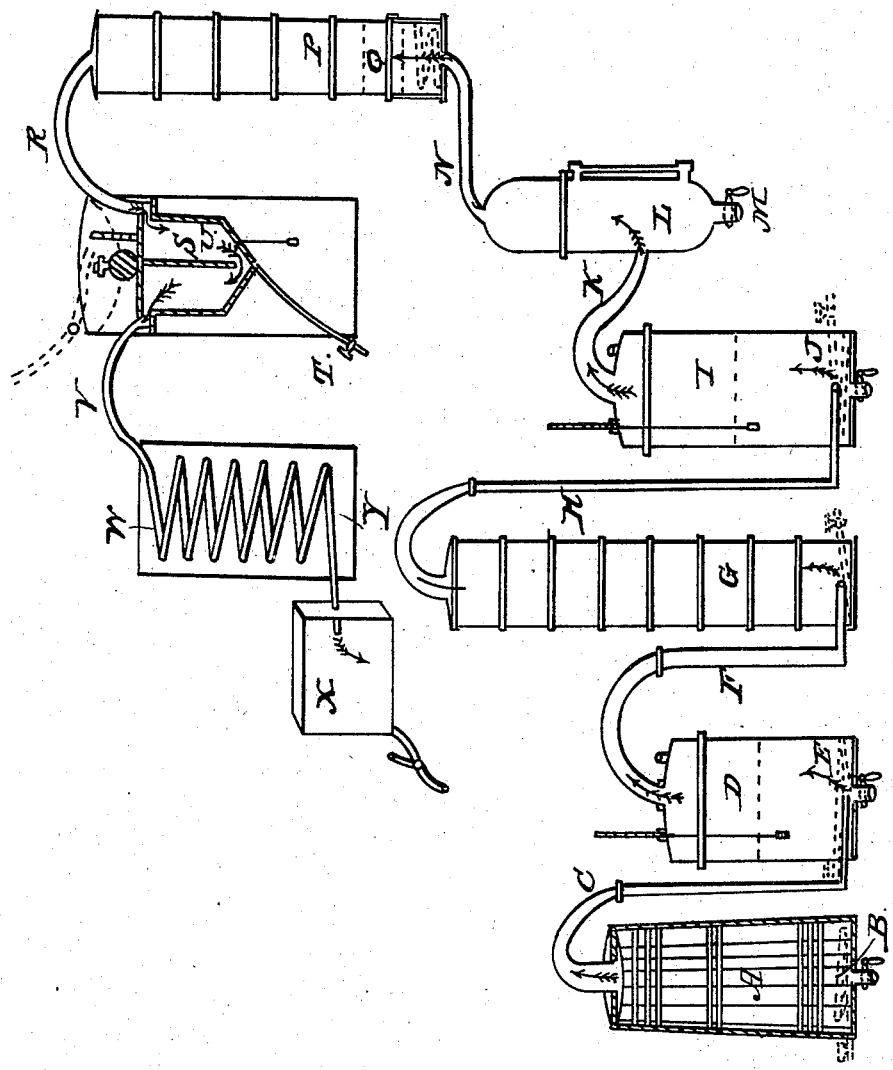
Witnesses
Charles L. Bangs
Franklin Barrett
Inventor
Ferdinand Renz

United States Patent Office.

FERDINAND RENZ, OF POUGHKEEPSIE, NEW YORK, ASSIGNOR TO HIMSELF AND JOHN A. BAYLY, OF SAME PLACE.

Letters Patent No. 80,835, dated August 11, 1868.

IMPROVED PROCESS OF MANUFACTURING SULPHURIC ETHER.

*The Schedule referred to in these Letters Patent and making part of the same.*

TO ALL WHOM IT MAY CONCERN:

Be it known that I, FERDINAND RENZ, of Poughkeepsie, Dutchess county, and State of New York, have invented certain new and useful Improvements in the Method or Process of Making Sulphuric Ether; and I do hereby declare that the following is a full description of the same, reference being had to the accompanying drawings, illustrative of the progressive operations in making the sulphuric ether, and forming a part of this specification, the same letters of reference, wherever they occur, referring to like parts.

The nature of my invention consists in making sulphuric ether direct from the steam of mashes of corn, barley, and other grains, or molasses, or sugar, in combination with sulphuric acid.

To do this, I adopt the following process, which is carried on by means of apparatus substantially like that represented in the accompanying drawings.

I first take about one thousand pounds of mashed or cracked corn or other grain, and form a mash of it in the tub A, and, by means of heater-pipes B, heat the mash to 212° Fahrenheit. The steam thus generated in the mash-tub is then allowed to escape, by the pipe C, to a receiver, D, in which are about forty-five pounds of sulphuric acid, heated, by means of steam-pipes E, up to about 235° to 245° Fahrenheit grade, thereby converting the sulphuric acid into sulpho-vinic acid. The vapor or gas of this product then escapes from the receiver, by the pipe F, to the lower end of a water-bath or washer, G, heated to about 195°.

From this washer the sulpho-vinic-acid gas escapes, by the pipe H, to a receiver I, containing one hundred and sixty to one hundred and seventy pounds of sulphuric acid, heated, by means of a steam-pipe, J, to about 275° to 300° Fahrenheit grade, thereby converting the sulpho-vinic-acid gas into sulphuric ether and water.

For the purpose of purifying the sulphuric ether from any impurities, or any excess of acid, it is carried through a pipe, K, and a protector-vessel, L. The object of this vessel is, that should the high degree of heat in the vessel I force any water or sulphuric acid over with the steam and sulphuric ether, they would be collected in the lower part of the protector, to be drawn off by the cock M, while the steam and sulphuric ether escaped by the pipe N to a purifier-vessel, P. In the lower part of this vessel, as shown at Q, is a compartment containing carbonate of potassa, or other equivalent alkali, and above which are two or more water-baths or boxes, which are, as well as that of the alkaline bath, kept at a temperature of about 175° Fahrenheit grade, and through which, in successive order, the sulphuric ether is made to pass.

The object of this purifier is to absorb any acid or other impurities that may have come over with the steam or sulphuric ether.

The sulphuric ether and steam escaping from the purifier are then conveyed, by a pipe, R, to a separator-vessel, S, heated to about 145° to 150° Fahrenheit grade, which being considerably below the boiling-point of water, causes the watery particles of the ether or steam to condense, and deposit in the lower part of the separator-vessel, to escape therefrom by the pipe T, while the sulphuric ether, in the state of vapor, passes under the partition U, and escapes by the pipe V, to a coiled-pipe condenser W, from whence it is discharged into any suitable receiver X, in a liquid form, pure sulphuric ether.

Having now described my invention of a new process for making sulphuric ether, I will proceed to set forth what I claim and desire to secure by Letters Patent of the United States.

I claim the method or process of making sulphuric ether direct from the steam of boiling mashes of corn, barley, or other grains, or molasses, or sugar, substantially as hereinbefore described.

FERDINAND RENZ.

Witnesses:
CHARLES L. BARRITT,
FRANKLIN BARRITT.